Patented Feb. 14, 1933

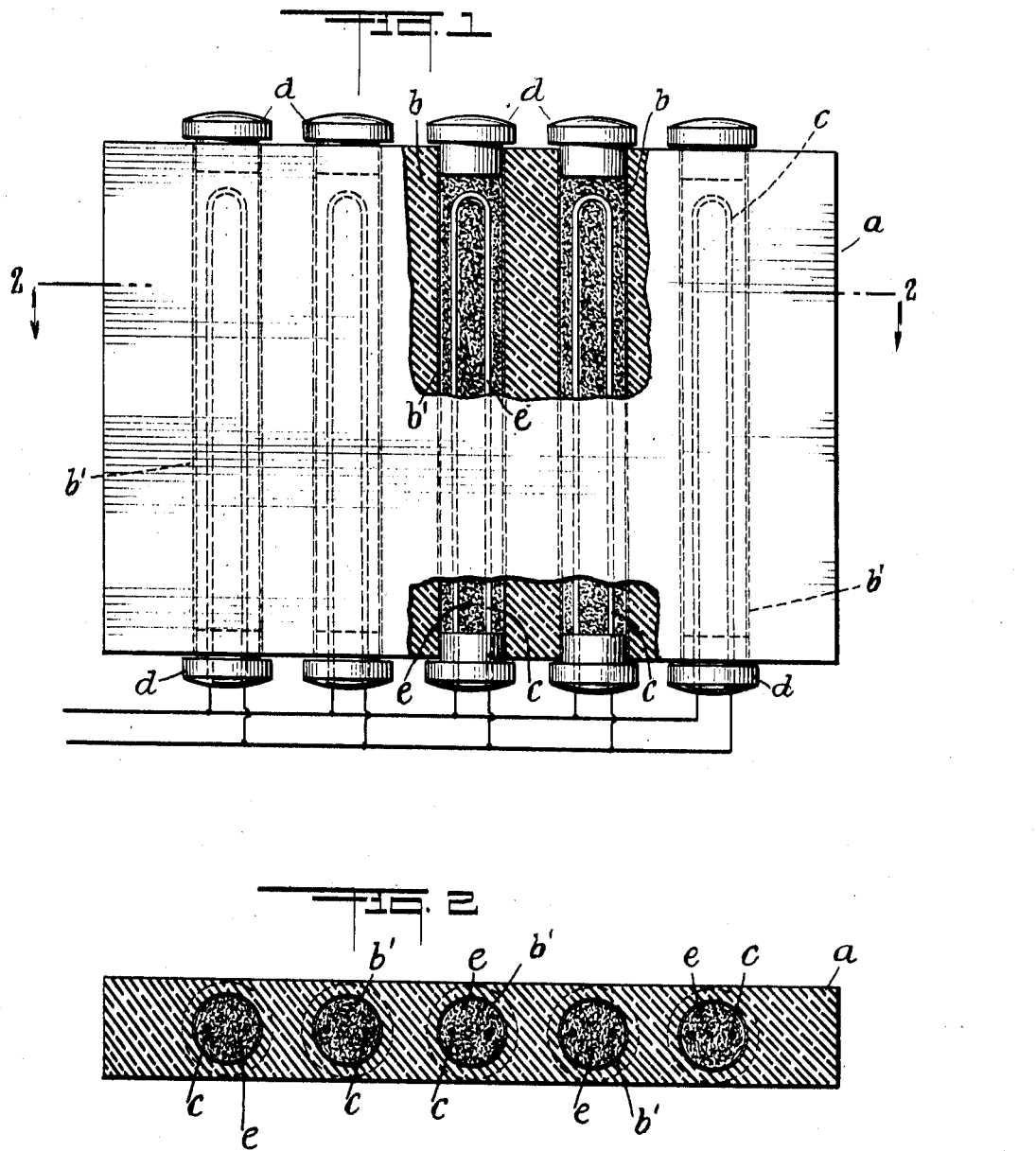

1,897,197

UNITED STATES PATENT OFFICE

FRANZ JOLAS, OF COLOGNE, GERMANY

HEATING PLATE

Application filed March 15, 1930, Serial No. 436,156, and in Germany December 30, 1929.

This invention relates to heating plates and more particularly to heating plates provided with channels containing electrical resistances and mercury or a similar substance.

The principal object of the invention is the provision of a heating plate wherein the heat energy of the electrical resistances is very efficiently, quickly and uniformly transmitted to the heating plate.

Other objects of the invention will be suggested to those skilled in the art as the description thereof is developed hereinafter.

Heating plates provided with channels containing electrical resistances are known in the art and the transmission of heat from the electrical resistances to the heating plate is generally effected inefficiently by radiation or convection. According to the present invention, however, the channels of the heating plate contain mercury or a similar substance in which the resistances are placed. This construction presents the advantage that, when the electrical resistances become incandescent, the mercury or other substance becomes very hot and expands against the walls of the channels to completely fill the same. Consequently the heat of the resistance is transmitted efficiently, quickly and uniformly to the heating plate.

Reference is made hereby to the accompanying drawing wherein like reference letters refer to similar parts and wherein:

Figure 1 is a plan view of the heating plate according to the invention.

Figure 2 is a section on the line II—II of Figure 1.

The heating plate $a$ is provided with a plurality of channels $b$. The heating plate $a$ may be made of any suitable material such as cast iron whereas the channels $b$ are preferably of circular cross-section being transversely of the heating plate $a$ and parallel to each other.

The walls of the channels $b$ are covered with a suitable insulating material $b'$ such as enamel. Caps $d$ of non-conducting material are positioned at each end of each channel and may be slightly inserted into the ends thereof. The electrical resistances $c$ are positioned in said channels $b$ in spaced relation to the walls thereof. Said resistances $c$ pass through and are held in position by the caps $d$ at one end of each channel.

The channels $b$ closed by the caps $d$ are suitably filled with a substance $e$ of high heat conductivity, capable of expanding and assuming upon expansion the shape of the channels. Mercury has all of the necessary characteristics and is quite adequate.

The resistances $c$ are connected to a source of electrical energy in any desired manner, preferably in parallel since such connection gives more desirable operating characteristics for a bank of electrical heating resistances. The operation of the heating plate will also be made more constant by the provision of electrical energy of constant current.

Since many and varied modification of the invention may be made, this disclosure is to be construed in an illustrative and not in a limiting sense.

Having now particularly described my invention, what I claim as new and desire to secure by Letters Patent, is:

A heating plate comprising in combination a plate having a plurality of straight parallel insulated channels, means for closing said channels at both ends, insulated electric resistances in said channels, and a mercury filling in said channels surrounding said insulated resistances.

FRANZ JOLAS.